United States Patent
Brandstein et al.

(10) Patent No.: US 9,187,666 B2
(45) Date of Patent: Nov. 17, 2015

(54) MILL BASE COMPOSITION AND UV CURABLE INK COMPOSITION COMPRISING SAME

(75) Inventors: Or Brandstein, Haifa (IL); Alex Trubnikov, Petach Tiqwa (IL); Eytan Cohen, Raanana (IL); Ziv Belman, Kiryat-Yam (IL); Kobi Cohen, Kfar Yonah (IL)

(73) Assignee: Hewlett-Packard Industrial Printing LTD., Netanya (IL)

(*) Notice: Subject to any disclaimer, the term of this patent is extended or adjusted under 35 U.S.C. 154(b) by 0 days.

(21) Appl. No.: 14/110,153

(22) PCT Filed: Apr. 12, 2011

(86) PCT No.: PCT/IL2011/000301
§ 371 (c)(1),
(2), (4) Date: Oct. 6, 2013

(87) PCT Pub. No.: WO2012/140639
PCT Pub. Date: Oct. 18, 2012

(65) Prior Publication Data
US 2014/0024737 A1      Jan. 23, 2014

(51) Int. Cl.
| | |
|---|---|
| C08F 2/46 | (2006.01) |
| C08G 61/04 | (2006.01) |
| C09D 11/38 | (2014.01) |
| C09B 67/04 | (2006.01) |
| C09B 67/00 | (2006.01) |
| C09D 11/101 | (2014.01) |
| C09D 11/326 | (2014.01) |
| C09B 67/46 | (2006.01) |

(52) U.S. Cl.
CPC ............ C09D 11/38 (2013.01); C09B 67/0002 (2013.01); C09B 67/009 (2013.01); C09B 67/0022 (2013.01); C09D 11/101 (2013.01); C09D 11/326 (2013.01)

(58) Field of Classification Search
CPC .... C09D 11/38; C09D 11/101; C09D 11/326; C09B 67/002; C09B 67/0022; C09B 67/009
USPC ................... 522/174, 173, 1; 520/1
See application file for complete search history.

(56) References Cited

U.S. PATENT DOCUMENTS

| | | | |
|---|---|---|---|
| 5,889,084 A | 3/1999 | Roth | |
| 6,099,631 A | 8/2000 | Tregub et al. | |
| 6,114,406 A | 9/2000 | Caiger et al. | |
| 7,026,368 B2 | 4/2006 | Yamada et al. | |
| 7,074,268 B2 | 7/2006 | Imagawa et al. | |
| 7,074,842 B2 | 7/2006 | Chung et al. | |
| 7,553,365 B2* | 6/2009 | Sakamoto et al. | 106/499 |
| 7,651,558 B2* | 1/2010 | Heitzmann | 106/31.6 |
| 8,129,441 B2 | 3/2012 | Lafuente Cerda et al. | |
| 2003/0081092 A1 | 5/2003 | Ishizuka et al. | |
| 2007/0076071 A1 | 4/2007 | Iu et al. | |
| 2008/0316244 A1 | 12/2008 | Lugassi et al. | |
| 2010/0047457 A1 | 2/2010 | Bentley | |
| 2010/0304149 A1 | 12/2010 | Loccufier et al. | |

FOREIGN PATENT DOCUMENTS

| | | | |
|---|---|---|---|
| DE | 10 2009 046130 | * | 5/2010 |
| DE | 102009046130 A1 | | 5/2010 |
| EP | 1970417 A1 | | 9/2008 |
| JP | 2009-073945 | * | 4/2009 |
| JP | 2009073945 A | | 4/2009 |
| WO | 2008055954 A1 | | 5/2008 |
| WO | 2010112427 A1 | | 10/2010 |

OTHER PUBLICATIONS

Staffel et al, DE 10 2009 046130 Machine Translation, May 12, 2010.*
Oshima, JP 2009-073945 Machine Translation, Apr. 9, 2009.*
Oshima, JP 2009-073945 Machine Translation Part 2, Apr. 9, 2009.*
International Search Report and Written Opinion (ISR/WO) of the International Searching Authority (ISA/EP) for counterpart PCT Application No. PCT/IL2011/000301, dated Aug. 17, 2011, 12 pages.
Database CA [Online] Chemical Abstracts Service, Columbus, Ohio, US; XP-002649922, regarding JP 2009 435224 A (FPD1 listed above), 3 pages, 2009.
Database WPI Week 200929, Thomson Scientific, London, GB; AN 2009-H03249, XP-002649923, regarding JP 2009 435224 A Fuji Film Co., Ltd (FPD1 listed above), 2 pages, 2009.

* cited by examiner

*Primary Examiner* — Ling Choi
*Assistant Examiner* — Jessica E Whiteley
(74) *Attorney, Agent, or Firm* — North Shore Associates

(57) ABSTRACT

A mill base composition includes a compound comprising a divinyl ester of a dicarboxylic acid, a dispersing agent, and a pigment. The divinyl ester of the carboxylic acid includes from 2 to about 8 carbon atoms. The mill base composition is subjected to milling with milling beads to produce a milled mill base composition that functions as a pigment concentrate that may be added to an ink vehicle to form an ink composition suitable for use in inkjet ink devices. The milled mill base composition is particularly suited for UV curable ink compositions. A UV curable ink composition includes the pigment concentrate, one or more UV curable monomers, and one or more UV initiators.

16 Claims, No Drawings

MILL BASE COMPOSITION AND UV CURABLE INK COMPOSITION COMPRISING SAME

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers are now very common and affordable and allow one to obtain decent print quality. They are used in home printing, office printing and commercial printing. The growth of inkjet printing is a result of a number of factors including reductions in cost of inkjet printers and improvements in print resolution and overall print quality. A continued demand in inkjet printing has resulted in a need to produce images of high quality, high permanence and high durability while maintaining a reasonable cost.

Inkjet printing is a popular method of non-contact printing on a broad selection of substrates. One popular variety of inkjet printing involves using UV curable inkjet inks, which enable high printing speed. UV curable inkjet inks have relatively good adhesion on variety of substrates and they have low Volatile Organic Compound (VOC) content. There are two types of UV inks, radical curing inks and cationic curing inks or hybrids thereof. The majority of inks currently used in the industry are radical inks although some cationic inks exist.

One of the major shortcomings of UV curable components is that a majority of such components have intrinsic high viscosity, which limits the ink design space and the ability to formulate inks suitable for inkjet application. This problem is common for both radical UV curable components and cationic UV curable components. Mill bases are employed in the milling of pigment particles to further the dispersion of the particles in a resulting ink. The mill bases used in the preparation of UV curable inkjet inks are characterized by relatively high pigment load, which is at least 20% by weight pigment content in the mill base.

DETAILED DESCRIPTION

There is a need in the industry to have a milling vehicle component that can be used in the preparation of both types of UV curable inks and in the preparation of hybrid UV inks. The pigments are usually milled in a UV curable carrier with beads having a diameter of about 0.65 millimeters (mm), for example. By reducing the size of pigment particles during a milling process, ink jetting reliability and colloidal stability of the ink dispersion may be improved. Milling a mill base with beads much lower than the above would further this goal. The milling vehicle component should enable milling in a high pigment load environment where at least one step in the milling process is carried out with a milling media having a diameter not larger than about 0.3 millimeters (mm) without a substantial negative effect on the quality of inks obtained from a mill base composition.

Examples of mill base compositions in accordance with the principles described herein comprise a divinyl ester of a dicarboxylic acid as a milling vehicle component. Examples of mill base compositions in accordance with the principles described herein allow for milling pigments with relatively smaller milling media. Mill base compositions in accordance with the principles described herein may be subjected to an initial milling step using milling beads larger than 0.45 mm, followed by a milling step with milling beads having a diameter no larger than about 0.3 mm. As a consequence of effectively reducing the size of pigment particles, ink jetting reliability and colloidal stability of the ink dispersion are improved. In addition to allowing for high pigment loading with relatively smaller milling media, examples of mill base compositions in accordance with the principles described herein allow small pigment particle size, narrow particle size distribution, good rheology, high curing speed and excellent color strength when formulated in inkjet inks By reducing the size of pigment particles during a milling process, ink jetting reliability and colloidal stability of the ink dispersion may be improved.

Examples of mill base compositions in accordance with the principles described herein may be used in the preparation of UV curable inkjet inks including radical, cationic and cationic-radical hybrid UV curable inkjet inks. The inkjet inks produced using milled mill base compositions in accordance with the principles described herein exhibit improved inkjet ink and mill base rheology, reduced mill base and inkjet ink viscosity, and improved inkjet ink stability (aging). Moreover, the inkjet inks produced using milled mill base compositions described herein enable stable cationic radical hybrid inkjet ink formulations. Furthermore, examples of mill base compositions described herein have a minimal, if any, negative effect on ink qualities. Using milled mill base compositions in accordance with the principles described herein to prepare inkjet ink compositions does not reduce other qualities of an ink composition compared to similar inks made from a milled mill base composition that does not comprise a compound comprising a divinyl ester of a dicarboxylic acid.

Some examples in accordance with the principles described herein are directed to mill base compositions that comprise a compound comprising a divinyl ester of a dicarboxylic acid wherein the dicarboxylic acid comprises from 2 to about 8 carbon atoms, a dispersing agent, and a pigment.

The phrase "mill base composition" means a composition comprising pigment particles, dispersing agent, and a milling vehicle. The pigment particles are to be reduced to a size suitable for combining with an ink vehicle to produce an ink composition.

The phrase "a compound comprising a divinyl ester of a dicarboxylic acid" refers to a compound that contains at least two vinyl esterified carboxylic acid groups. In some examples, a compound comprising a divinyl ester of a dicarboxylic acid comprises two vinyl esterified carboxylic acid groups.

The phrase "dicarboxylic acid" refers to an organic acid that comprises 2 to 8 carbon atoms, or 2 to 7 carbon atoms, or 2 to 6 carbon atoms, or 2 to 5 carbon atoms, or 2 to 4 carbon atoms, or 2 to 3 carbon atoms, or 3 to 8 carbon atoms, or 3 to 7 carbon atoms, or 3 to 6 carbon atoms, or 3 to 5 carbon atoms, or 3 to 4 carbon atoms, or 4 to 8 carbon atoms, or 4 to 7 carbon atoms, or 4 to 6 carbon atoms, or 4 to 5 carbon atoms, or 5 to 8 carbon atoms, or 5 to 7 carbon atoms, or 5 to 6 carbon atoms, or 6 to 8 carbon atoms, or 6 to 7 carbon atoms, or 7 to 8 carbon atoms, for example, and two carboxylic acid groups, that is, —COOH groups, for example, where the number of carbon atoms of the carboxylic acid group is included in the number of carbon atoms referred to above. Dicarboxylic acids that may be employed in examples in accordance with the principles described herein include, but are not limited to, oxalic acid, malonic acid, succinic acid, glutaric acid, adipic acid, cyclohexyl dicarboxylic acid, phthalic acid, terephthalic acid, and pimelic acid, for example.

The phrase "divinyl ester" refers to vinyl moieties that are attached to two carboxylic acid groups of the dicarboxylic acid where the form of attachment is an ester bond. The phrase "vinyl moieties" refers to organic moieties that comprise at least one carbon-carbon double bond. The vinyl moiety may comprise one or more substituents in place of one or more of the hydrogens of the vinyl moiety. Such substituents include, by way of illustration and not limitation, alkyl groups, an aryl groups, and an alkaryl groups, for example.

The term "alkyl" as used herein means a branched, unbranched, or cyclic saturated hydrocarbon group, which typically, although not necessarily, contains from 1 to about 20 carbon atoms, or 1 to about 15 carbon atoms, or 1 to about 10 carbon atoms, or 1 to about 5 carbon atoms, for example. Alkyl groups include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. In some examples, the alkyl group may comprise a halo group (chloro, bromo, iodo, fluoro) substitution in place of, e.g., one or more of the hydrogens of the alkyl group.

The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, about 5 to about 20 carbon atoms, or about 5 to about 15 carbon atoms, or about 5 to 10 carbon atoms or more. Aryl groups include, for example, phenyl, naphthyl, anthryl, phenanthryl, and biphenyl.

The term "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings (each ring atom is a carbon atom) and/or heterocyclic rings (at least one ring atom is not carbon and is a heteroatom).

The term "alkaryl" includes those moieties that comprise both an alkyl group and an aryl group.

Examples of vinyl moieties include, but are not limited to, those moieties represented by the formula:

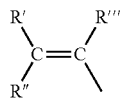

wherein R', R", and R'" are, but are not limited to, hydrogen, alkyl, aryl, and alkaryl, for example. In some examples in accordance with the principles described herein, R', R", and R'" are hydrogen, or one of R', R", and R'" is methyl and the others are hydrogen, or R' is methyl and R" and R'" are hydrogen, for example.

In some examples in accordance with the principles described herein, the compound comprising a divinyl ester of the dicarboxylic acid has a viscosity of about 0.5 to about 15 millipascal seconds (mpas), or about 0.5 to about 10 mpas, or about 0.5 to about 5 mpas, or about 1 to about 15 mpas, or about 1 to about 10 mpas, or about 1 to about 5 mpas, for example. In some examples in accordance with the principles described herein, the divinyl ester of the dicarboxylic acid has a vapor pressure less than about 0.1 millibar (mbar), or less than about 0.05 mbar, or less than about 0.01 mbar. In some examples in accordance with the principles described herein, the divinyl ester of the dicarboxylic acid has a boiling point greater than about 150° C., or greater than about 170° C., or greater than about 230° C.

An amount of the compound comprising a divinyl ester of a dicarboxylic acid in the mill base composition is chosen to be at an optimum amount that enables high pigment loading, good ink rheology, low viscosity and improved storage stability. In some examples in accordance with the principles described herein, the amount (by weight) of divinyl ester in the mill base composition is about 30% to about 60%, or about 30% to about 55%, or about 30% to about 50%, or about 30% to about 45%, or about 30% to about 40%, or about 30% to about 35%, or about 35% to about 60%, or about 35% to about 55%, or about 35% to about 50%, or about 35% to about 45%, or about 35% to about 40%, or about 40% to about 60%, or about 40% to about 55%, or about 40% to about 50%, or about 40% to about 45%, or about 45% to about 60%, or about 45% to about 55%, or about 45% to about 50%, or about 50% to about 60%, for example.

In some examples in accordance with the principles described herein the compound comprising a divinyl ester of the dicarboxylic acid is selected from the group consisting of adipic acid divinyl ester (AVES), cyclohexyl dicarboxylic acid divinyl ester (CHDVES), and terephthalic acid divinyl ester (TVES), and combinations thereof. In some examples in accordance with the principles described herein, the dicarboxylic acid divinyl ester is AVES, which has a viscosity of 2.5 mpas at 30° C., a vapor pressure less than 0.01 mbar and a boiling point greater than 230° C.

The mill base composition in accordance with the principles described herein includes a dispersing agent. The choice of a dispersing agent is dependent on one or more factors such as, for example, facilitation of deaggregation of pigment agglomerates and stabilization of pigment particles during a milling process, the size of the milled pigment particles, and the physical properties of the milled composition.

In some examples in accordance with the principles described herein, the dispersing agent is, by way of illustration and not limitation, a polyester, a polyurethane, or a polyalkylene imine, for example, which may comprise one or more ionic groups, acidic groups, and alcohol groups, for example. By way of illustration and not limitation, specific examples of polyesters that may be employed as dispersing agents in accordance with the principles described herein include SOLSPERSE® 32000 and SOLSPERSE® J200 (both from Lubrizol Corporation, Rancho Santa Margarita Calif.), for example. By way of illustration and not limitation, examples of polyurethanes that may be employed as dispersing agents in accordance with the principles described herein include SOLSPERSE® 76500 (Lubrizol Corporation), for example. By way of illustration and not limitation, specific examples of polyalkylene imines that may be employed as dispersing agents in accordance with the principles described herein include SOLSPERSE® 39000 (Lubrizol Corporation), for example.

In some examples in accordance with the principles described herein, the amount (by weight) of dispersing agent in the mill base composition is about 5% to about 50%, or about 5% to about 40%, or about 5% to about 30%, or about 5% to about 20%, or about 5% to about 10%, or about 10% to about 50%, or about 10% to about 40%, or about 10% to about 30%, or about 10% to about 20%, or about 20% to about 50%, or about 20% to about 40%, or about 20% to about 30%, or about 30% to about 50%, or about 30% to about 40%, or about 40% to about 50%, for example, of the mill base composition.

In some examples in accordance with the principles described herein, the dispersing agent further comprises an organic solvent, which may be soluble in water or miscible in water. The dispersing agent may include organic solvents as diluents to adjust viscosity of the dispersing agent to a level that is suitable for milling the mill base composition such as, for example, where the viscosity of the active reagent of the dispersant agent is too high or the dispersing agent is too difficult to handle. A single organic solvent or a combination of two or more organic solvents may be used.

In some examples, the organic solvent is a polar organic solvent having about 2 to about 50 carbon atoms, or about 2 to about 40 carbon atoms, or about 2 to about 30 carbon atoms, or about 2 to about 20 carbon atoms, or about 2 to about 10 carbon atoms, or about 5 to about 50 carbon atoms, or about 5 to about 40 carbon atoms, or about 5 to about 30 carbon atoms, or about 5 to about 20 carbon atoms, or about 5 to about 10 carbon atoms, or about 10 to about 50 carbon atoms, or about 10 to about 40 carbon atoms, or about 10 to about 30 carbon atoms, or about 10 to about 20 carbon atoms, or about 10 to about 15 carbon atoms. In some examples, the organic solvent further has 1 to about 20 heteroatoms, or about 1 to about 15 heteroatoms, or about 1 to about 10 heteroatoms, or about 1 to about 5 heteroatoms, or about 2 to about 20 heteroatoms, or about 2 to about 15 heteroatoms, or about 2 to about 10 heteroatoms, or about 2 to about 5 heteroatoms, or about 3 to about 20 heteroatoms, or about 3 to about 15 heteroatoms, or about 3 to about 10 heteroatoms, or about 3 to about 5 heteroatoms, or about 4 to about 20 heteroatoms, or about 4 to about 15 heteroatoms, or about 4 to about 10 heteroatoms, or about 4 to about 5 heteroatoms, or about 5 to about 20 heteroatoms, or about 5 to about 15 heteroatoms, or about 5 to about 10 heteroatoms, for example. The heteroatoms may be in the form of one or more alcohol moieties, ether moieties, ketone moieties, aldehyde moieties, amine moieties, and amide moieties, for example.

In some examples the organic solvent has a boiling point of about 120° C. to about 250° C., or about 120° C. to about 225° C., or about 120° C. to about 200° C., or about 120° C. to about 175° C., or about 120° C. to about 150° C., or about 130° C. to about 250° C., or about 130° C. to about 225° C., or about 130° C. to about 200° C., or about 130° C. to about 180° C., or about 130° C. to about 160° C., or about 140° C. to about 230° C., or about 140° C. to about 200° C., or about 140° C. to about 180° C., or about 140° C. to about 160° C., or about 150° C. to about 250° C., or about 150° C. to about 225° C., or about 150° C. to about 200° C., or about 150° C. to about 175° C., for example.

In some examples, the organic solvent is, by way of illustration and not limitation, an ester of a carboxylic acid (for example, acetic acid, propanoic acid, butanoic acid, or pentanoic acid) and an alcohol (for example, methanol, ethanol, propanol, isopropanol, butanol, isobutanol, sec-butanol, t-butanol, pentanol, hexanol, cyclohexanol or benzyl alcohol); a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol); a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether); an amine (for example, triethylenetetramine, polyethyleneimine or tetramethylpropylenediamine); an amide; and other organic solvents such as, for example, dimethylsulfoxide, sulfolane, 2-pyrrolidone, N-methyl-2-pyrrolidone, N-vinyl-2-pyrrolidone, 2-oxazolidone, or 1,3-dimethyl-2-imidizolidinone). The above-mentioned organic solvents can be used in combination of two or more thereof. In some examples in accordance with the principles described herein, the organic solvent is an acetate, a glycol, a glycol ether or a heterocyclic ketone, or a combination of two or more of the above.

In some examples in accordance with the principles described herein, the amount of organic solvent in the dispersing agent is about 30% to about 50%, or about 30% to about 45%, or about 30% to about 40%, or about 30% to about 35%, or about 35% to about 50%, or about 35% to about 45%, or about 35% to about 30%, or about 35% to about 50%, or about 35% to about 45%, or about 35% to about 40%, by weight of the dispersing agent, for example.

Some examples of particular organic solvents that may be in the dispersing agent in accordance with the principles described herein include, by way of illustration and not limitation, acetates such as, e.g., methoxypropylacetate and butyl acetate, and glycols such as, for example, butylglycol, for example.

In some examples in accordance with the principles described herein, the dispersing agent may further comprise a (meth)acrylic monomer in place of some or all of the aforementioned organic solvent. The use of (meth)acrylic monomer in place of some or all of the organic solvent may result in better curing properties or ink stability depending on the composition of an ink composition. The phrase "(meth) acrylic monomer" includes both acrylic monomers and methacrylic monomers. In some examples, the (meth)acrylic monomer is selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, and isobornyl methacrylate, and combinations of two or more of the above.

In some examples in accordance with the principles described herein, the total amount of (meth)acrylic monomer and organic solvent in the dispersing agent is about 30% to about 50%, or about 30% to about 45%, or about 30% to about 40%, or about 30% to about 35%, or about 35% to about 50%, or about 35% to about 45%, or about 35% to about 40%, by weight of the dispersing agent, for example. In some examples in accordance with the principles described herein, one or both of the organic solvent and the (meth)acrylic monomer may be provided in a commercially available dispersing agent.

The mill base composition in accordance with the principles described herein includes a pigment, which in many examples is a particulate pigment. The particulate pigment may be inorganic or organic. In some examples, the pigment of the ink composition is a pigment coated with or encapsulated in an organic polymer. The pigment may be a naturally-occurring pigment or a synthetic pigment. The pigment can be of any color including, but not limited to, black, blue, brown, cyan, green, white, violet, magenta, red, orange and yellow, as well as spot colors from mixtures thereof.

The particulate pigment may be a single particulate pigment or a mixture of two or more particulate pigments. Thus, there may be at least one particulate pigment or at least two particulate pigments or at least three particulate pigments, for example. The number of pigments in a mixture of pigments that comprise the particulate pigment is in the range of 2 to about 5, or 2 to about 4, or 2 to about 3. The particulate pigment for the mill base composition is in many instances in the form of larger particles having an average diameter of about 1 micron to about 500 microns, or about 10 micron to about 500 microns, or about 100 micron to about 500 microns, or about 1 micron to about 400 microns, or about 1 micron to about 300 microns, or about 1 micron to about 200 microns, or about 1 micron to about 100 microns, for example.

The shape of the particulate pigment may be regular or irregular. The particulate pigment may be in the form of a bead, flake, plate, rod, platelet, cube and column, for example. In some examples the cross-sectional shape of the particulate pigment may be circular, triangular, square, quadrangular, hexangular, oval, scalloped, corrugated, or ellipsoidal, for example.

Examples of organic pigments that may be present in the ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, for example, and mixtures of two or more of the above and derivatives of the above.

Inorganic pigments that may be present in the pigment dispersion, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Particular examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY 213. Magenta pigments composed of Red pigment having color indices of PR 202, PR 254, PR 122, PR 149, PR 185, PR 255, PR 146 and Violet pigment having color indices of PV 19, PV 23, PV 37 and PV 29 may be used. Blue pigments having color indices of PB 15:3, PB 15:4, PB 15:2, and PB 15:1, as well as black pigments having color indices of PBL Black 7 may be utilized. Inorganic pigment such as a white pigment of the type $TiO_2$ may be used. Orange pigment having color indices of PO46, PO64, PO34 as well as green pigments having color index of PG7 may be employed.

Certain pigments that may be employed in examples in accordance with the present disclosure are found under the trade names PALIOTOL®, HELIOGEN®, CHROMOPHTAL®, IRGALITE®, and CINQUASIA® (available from BASF Corporation, Port Arthur Tex.), HOSTAPERM® and NOVOPERM® (available from Clariant International Ltd., Muttenz, Switzerland), SUNFAST® and QUINDO® (available from SunChemical Corporation, Riverside Calif.), SPECIAL BLACK® (available from Evonik Degussa Corporation, Theodore Ala.), KRONOS® (Kronos Inc., Cranbury N.J.), and KEMIRA® (Kemira Chemicals Inc., Atlanta Ga.).

The amount of the pigment in the mill base composition depends on a number of factors, for example, the nature of the pigment, the nature of the dispersing agent, the nature of the use of an ink composition comprising the milled mill base composition, and the nature of any additives, for example. The mill base composition may contain an amount of pigment (percent by weight of the mill base composition) of about 10% to about 70%, or about 10% to about 60%, or about 10% to about 50%, or about 10% to about 40%, or about 10% to about 30%, or about 10% to about 20%, or about 20% to about 70%, or about 20% to about 60%, or about 20% to about 50%, or about 20% to about 40%, or about 20% to about 30%, or about 30% to about 70%, or about 30% to about 60%, or about 30% to about 50%, or about 30% to about 40%, or about 40% to about 70%, or about 40% to about 60%, or about 40% to about 50%, for example. The amount of pigment present in the mill base composition may range between any combinations of these values, inclusive of the recited values.

In some examples in accordance with the principles described herein, the mill base composition may comprise other components to improve properties or performance of the mill base composition, for example. Such components include, but are not limited to, one or more of anti-foaming agents, polymerization stabilizers, and synergists, for example. The total amount by weight of such components in the mill base composition is about 0.1% to about 1%, or about 0.1% to about 0.5%, or about 0.1% to about 0.2%, or about 0.2% to about 1%, or about 0.2% to about 0.5%, or about 0.5% to about 1%, for example.

Specific examples of polymerization stabilizers, by way of illustration and not limitation, include GENORAD® 16 (Rahn USA Corporation, Aurora Ill.), IRGASTAB® UV22 (BASF), for example. Specific examples of synergists, by way of illustration and not limitation, include SOLSPERSE® 5000, SOLSPERSE® 22000 (both from Lubrizol), for example. Specific examples of anti-foaming agents that are commercially available include, but are not limited to, FOAMEX® 800, FOAMEX® 805, FOAMEX® 845, FOAMEX® 842, and FOAMEX® 835 (all available from Evonik Tego Chemie Service GmbH, Essen, Germany) and TWIN® 4000 (Evonik Tego Chemie Service GmbH); and BYK® 019, BYK® 028, and BYK® 029 (available from BYK Chemie GmbH, Wesel, Germany), for example.

Mill base compositions in accordance with the principles described herein, after milling, may be employed in ink compositions, which in many examples are curable by UV application. The mill base composition is subjected to milling and then combined with an ink vehicle to produce an ink composition.

Milling may be carried out using a horizontal bead mill, a vertical bead mill, or a basket mill, for example. In some examples, a horizontal bead mill is employed. In the milling step, a mill base composition in accordance with the principles described herein is combined with milling beads and subjected to conditions to sufficiently mill the mill base composition to such that larger pigment particles are broken into pigment particles of a size suitable for ink compositions. The resulting pigment particles are stabilized by the dispersing agent.

The composition of the milling beads employed should be such that the milling beads exhibit good fracture resistance and abrasion resistance, for example. The composition of the milling beads may be, by way of illustration and not limitation, glass, a metal oxide, or a metal alloy, for example. Metal oxides suitable as milling beads include, but are not limited to, zirconium oxide, for example.

The diameter of the milling beads depends on one or more of the nature of the milling beads and the nature of the pigment particles, for example. The diameter of the milling beads may be, by way of illustration and not limitation, about 0.05 mm to about 0.80 mm, or about 0.05 mm to about 0.65 mm, or about 0.05 mm to about 0.50 mm, or about 0.05 mm to about 0.35 mm, or about 0.05 mm to about 0.20 mm, or about 0.10 mm to about 0.80 mm, or about 0.10 mm to about 0.60 mm, or about 0.10 mm to about 0.40 mm, or about 0.10 mm to about 0.20 mm, or about 0.20 mm to about 0.80 mm, or about 0.20 mm to about 0.60 mm, or about 0.20 mm to about 0.40 mm, for example.

In some examples in accordance with the principles described herein, the milling of the mill base composition is carried out in multiple steps such as, for example, two steps, three steps, four steps or more with milling beads of decreasing diameter. In some examples, milling is carried out in a first step of the milling process with beads that are larger than about 0.40 mm, or larger than about 0.45 mm, or larger than about 0.50 mm, or larger than about, 0.55 mm, or larger than about 0.60 mm in diameter or a diameter in the range of about 0.40 mm to about 0.65 mm, for example. In a second step of the milling process, the milling is carried out with beads that are no larger than about 0.30 mm, or no larger than about 0.25 mm, or no larger than about 0.20 mm, or no larger than about 0.15 mm, or no larger than about 0.10 mm, or no larger than about 0.05 mm in diameter, for example. Additional milling steps may be carried out with beads having a diameter that is progressively lower that in the previous steps. In some examples in accordance with the principles described herein, a first step of the milling process is carried out using milling beads having a diameter of about 0.65 mm and a second step of the milling process is carried out using milling beads having a diameter of about 0.1 mm. The step-wise milling process may be carried out using milling beads that are the same composition for each milling step or using milling beads in one milling step that have a different composition than those of another milling step.

The milling process is carried out for a period of time such that the pigment particles are reduced to a size suitable for use in an ink composition. The period of time for the milling process depends on one or more of the nature of the pigment particles, the nature of the milling beads, and the nature of the milling apparatus, for example. In some examples the period of time for the each milling step of a step-wise milling process may be the same and in some examples the period of time may be different for one or more of the milling steps. The entire milling process may be carried out in about 0.5 hours to about 8 hours, or about 0.5 hours to about 4 hours, or about 1 hour to about 2 hours, for example. In a step-wise milling process, duration of each step may be, e.g., about 15 minutes to about 3 hours, or about 0.5 hours to about 2 hours.

The particle size (cross-sectional dimension) of the pigment in the mill base composition after being subjected to a milling process is in a range from about 1 nanometer (nm) to about 500 nm, or from about 1 nm to about 400 nm, or from about 1 nm to about 300 nm, or from about 1 nm to about 200 nm, or from about 1 nm to about 100 nm, or from about 1 nm to about 50 nm, or from about 5 nm to about 500 nm, or from about 5 nm to about 400 nm, or from about 5 nm to about 300 nm, or from about 5 nm to about 200 nm, or from about 5 nm to about 100 nm, or from about 5 nm to about 50 nm, or from about 10 nm to about 500 nm, or from about 10 nm to about 400 nm, or from about 10 nm to about 300 nm, or from about 10 nm to about 200 nm, or from about 10 nm to about 100 nm, or from about 10 nm to about 50 nm, for example.

The mill base composition after milling functions as a pigment concentrate and comprises the milled pigment. The milled mill base composition is combined with an ink vehicle to form an ink composition. In some examples in accordance with the principles described herein, a UV curable ink composition comprises the pigment concentrate, one or more UV curable monomers, and one or more UV initiators. As used herein, "ink vehicle" is defined to include any liquid composition that is used to carry pigments to an ink-receiving material or substrate. A wide variety of liquid vehicle components may be used. In some examples the liquid vehicle may include, by way of illustration and not limitation, one or more of a variety of different agents, such as one or more of UV curable agents, UV stabilizers and UV initiators, for example.

The term "UV curable agent" refers to a compound that comprises a functionality that, when subjected to UV energy, undergoes one or more of polymerization and crosslinking reactions. Such functionality may be curable by cationic, radical or cationic-radical hybrid mechanisms. Representative examples of UV curable functionalities include, but are not limited to, (meth)acrylate groups, olefinic carbon-carbon double bonds, epoxy groups, allyloxy groups, alpha-methyl styrene groups, (meth)acrylamide groups, cyanate ester groups, and vinyl ethers groups, for example, and combinations of two or more of the above.

UV curable agents include, by way of illustration and not limitation, UV radical curable monomers such as, but not limited to, monofunctional (meth)acrylates and multifunctional (di-, tri-, for example) (meth)acrylates, and mono functional and multi functional oligomers, for example, or combinations of two or more of the above; UV cationic curable monomers such as, but not limited to, epoxy monomers and oligomers, vinyl ether monomers and oligomers and combinations of two or more thereof; and UV cationic-radical hybrid monomers, for example. Selection of the appropriate combination of the above agents may be made on the basis of their ability to impart to an ink composition one or more of a particular viscosity, film-forming properties, flexibility, adhesion to substrates such as, e.g., plastics, wetting properties, cross-linking density, chemical resistance and scratch resistance of printed films, for example.

The curable agent is present in an ink composition in an amount (by weight of the ink composition) of about 10% to about 90%, or about 10 to about 80%, or about 10% to about 70%, or about 10% to about 60%, or about 10% to about 50%, or about 10% to about 40%, or about 10% to about 30%, or about 20% to about 90%, or about 20 to about 80%, or about 20% to about 70%, or about 20% to about 60%, or about 20% to about 50%, or about 20% to about 40%, or about 20% to about 30%, or about 30% to about 90%, or about 30 to about 80%, or about 30% to about 70%, or about 30% to about 60%, or about 30% to about 50%, or about 30% to about 40%, or about 40% to about 90%, or about 40 to about 80%, or about 40% to about 70%, or about 40% to about 60%, or about 40% to about 50%, for example.

UV agents curable by UV-initiated radical mechanism include, but are not limited to, 1,6-hexanediol diacrylate (HDDA) (SR238), difunctional acrylate monomer (SR4423), dipropylene glycol diacrylate (DPGDA) (SR508), tripropylene glycol diacrylate (TPGDA) (SR306), propoxylated 2-neopentyl glycol diacrylate (PONPGDA) (SR 9003), tridecyl acrylate (TA) (SR489), isodecyl acrylate (IDA) (SR395), 2-phenoxyethyl acrylate (PEA) (SR339C), lauryl acrylate (LA) (SR335), 2-(2-ethoxyethoxy)ethyl acrylate (EOEOEA) (SR256), tetrahydrofurfuryl acrylate (THFA) (SR285), isobornyl acrylate (IBOA) (SR506D), tetrahydrofurfuryl-methacrylate (THFMA) (SR203), 2-phenoxyethyl methacrylate (PEMA) (SR 340), isobornyl methacrylate (IBOMA) (SR423), polyester acrylate (ACTILANE® 505, CN 2505), dipentaerythritol hexaacrylate (DPHA) (ACTILANE® 450), stearyl acrylate (SR257, CD 586D), isooctyl acrylate (SR440), isotridecyl acrylate (SR489D), 1,3-butylene glycol diacrylate (SR212), 1,4-butanediol diacrylate (SR213), ethoxylated (3) bisphenol A diacrylate (SR349), tris(2-hydroxyethyl) isocyanurate triacrylate (SR368), trimethylolpropane triacrylate (SR351), polyethylene glycol (200) diacrylate (SR259), tetraethylene glycol diacrylate (SR268), triethylene glycol diacrylate (SR272), tripropylene glycol diacrylate (SR306), polyethylene glycol (400) diacrylate (SR344), ethoxylated bisphenol A diacrylate (CD9038), pentaerythritol tetraacrylate (SR295), di-trimethylolpropane tetraacrylate (SR355), dipentaerythritol pentaacrylate (SR399), ethoxylated trimethylolpropane triacrylate (SR415), pentaerythritol triacrylate (SR444), ethoxylated trimethylolpropane triacrylate (SR454), propoxylated trimethylolpropane triacrylate (SR492), ethoxylated trimethylolpropane triacrylate (SR499), propoxylated trimethylolpropane triacrylate (SR501), ethoxylated trimethylolpropane triacrylate (SR502), propoxylated (3) glyceryl triacrylate (SR9020), propoxylated glyceryl triacrylate (SR9021), ethoxylated trimethylolpropane triacrylate (SR9035, CN435), and ethoxylated (4) pentaerythritol tetraacrylate (SR494), for example, and combinations of two or more above. SR-designated and CD-designated curable agents are available from Sartomer USA LLC; ACTILANE®-designated curable agents are available from Akzo Nobel Chemicals, Pasadena Calif.

UV agents curable by UV-initiated cationic mechanism include, but are not limited to, epoxy monomers having 1 to about 6, or 1 to about 3 epoxy groups such as, for example, cycloaliphatic mono-epoxides, cycloaliphatic di-epoxides, epoxy grafted polyesters, and oxetanes, for example. Particular examples of UV agents curable by UV-initiated cationic mechanism include, but are not limited to, propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexane carboxylate, 3,4-epoxy-6-methylcyclohexylmethyl-3,4-epoxy-6-methylcyclohexane carboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenol-formaldehyde, resorcinol diglycidyl ether, epoxy silicones (e.g., dimethylsiloxanes having cycloaliphatic epoxide or glycidyl ether groups), aliphatic epoxy modified with propylene glycol and dipentene dioxide, limonene dioxide, silicone epoxy oligomers, α-pinene oxide, bisphenol-A epoxy, bis(3,4-epoxycyclohexyl)adipate, 3,4-epoxycyclohexylmethyl-3,4-epoxycyclohexane carboxylate, trimethylolpropane oxetane, and bis{[1-ethyl(3-oxetanyl)]methyl}ether oxetane monomer, for example, and combinations of two or more of the above.

The presence of organic solvents in an ink composition is primarily the result of the presence of organic solvent in the mill base composition or pigment concentrate, which may any of the organic solvents referred to above. In addition, the ink composition may comprise a high molecular weight silicone-based wetting agent such as, for example, TEGO RAD® 2100, TEGO RAD® 2200, TEGO RAD® 2250, and TEGO RAD® 2300 (Evonik Tego Chemie Service GmbH), and BYK® 307 and BYK® 333 (BYK Chemie GmbH).

The UV initiator or photoinitiator is an agent that initiates a reaction upon exposure to a desired wavelength of UV light to cure an ink composition in accordance with the principles described herein after application of the ink composition to an ink-receiving material or substrate. The UV initiator may be, by way of illustration and not limitation, radical, cationic, and radical-cationic, for example. The UV initiator may be a single compound or a mixture of two or more compounds. In some examples in accordance with the principles described herein, a UV initiator is present in the ink composition in an amount sufficient to cure the applied ink composition while maintaining reduced smear resistance, for example. In some examples, the UV initiator is present in the ink composition in an amount of from about 0.01% to about 10%, or about 1% to about 10%, or about 1% to about 5%, or about 1% to about 2% by weight, based on the total weight of the ink composition.

Examples of cationic UV initiators include, by way of illustration and not limitation, aryldiazonium salts, diaryliodonium salts, triarylsulphonium salts, triarylselenonium salts, dialkylphenacylsulphonium salts, aryloxydiarylsulphoxonium salts, and diarylphenacylsulphoxonium salts, for example. Particular examples of cationic UV initiators include, but are not limited to, diphenyl(4-phenylthio)-phenylsulfonium hexafloroatimonate, (thiodi-4,1-phenylene)bis (diphenylsulfonium)dihexafluoroatimonate (a mixture of the two sold under the name CHIVACURE® 1176 from Chitec Technology Co. Ltd, Phoenix Ariz.), diphenyl(4-phenylthio)-phenylsulfonium hexafluorophosphate, (thiodi-4,1-phenylene)bis(diphenylsulfonium)dihexafluorophosphate (a mixture of the two sold under the name CHIVACURE® 1190 from Chitec Technology Co. Ltd), triarylsulphonium hexafluorophosphate salt (CYRACURE® UVI-6990) and triarylsulphonium hexafluoroantimonate salt (CYRACURE® UVI-6974) (both available from Union Carbide Chemicals and Plastics Co. Inc., Danbury, Conn.), triphenylselenonium hexafluoroantimonate, triphenylsulfonium hexafluoroantimonate, triphenylsulfonium hexafluorophosphate, bis(4-dodecylphenyl)-iodonium hexafluoroantimonate, and η-5-2,4-cyclopentadiene-1-yl) [(1,2,3,4,5,6-η)-(1-methylethyl)benzene] iron (1+) hexafluorophosphate (1−) (IGRACURE® 261 from Ciba-Geigy Corporation, McIntosh Ala.), for example, and combinations or two or more of the above.

Examples of radical UV initiators include, by way of illustration and not limitation, 1-hydroxy-cyclohexylphenylketone, benzophenone, 2,4,6-trimethylbenzo-phenone, 4-methylbenzophenone, 2-benzyl 2-dimethylamino 1-(4-morpholinophenyl) butanone-1,2-methyl-1-(4-methylthio) phenyl-2-(4-morpholinyl)-1-propanone, diphenyl-(2,4,6-trimethylbenzoyl)phosphine oxide, phenyl bis(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethyl ketal, isopropylthioxanthone. Amine synergists may also be used, for example such as ethyl-4-dimethylaminobenzoate, 2-ethylhexyl-4-dimethylamino benzoate, 2-methyl-1-[4-(methylthio)phenyl]-2-morpholinopropan-1-one (OMNIRAD® 4817 from IGM Resins, Bartlett Ill.), 2,4,6-trimethylbenzoyl-diphenyl phosphine oxide (OMNIRAD® TPO from IGM Resins), 2-isopropylthioxanthone (OMNIRAD® ITX from IGM Resins), and bis(2,4,6-trimethylbenzoyl)-phenylphosphine-oxide (IRGACURE® 819 from BASF Corporation), for example, and combinations of two or more of the above.

As mentioned above, the ink compositions may comprise a UV stabilizer, that is, an agent that can assist with scavenging free radicals. Examples of UV stabilizers include, by way of illustration and not limitation, quinine methide (IRGASTAB® UV 22 from BASF Corporation) and GENORAD® 16 (Rahn USA Corporation), for example, and combinations of two or more UV stabilizers.

The amount of milled mill base composition or pigment concentrate in the ink composition depends on a number of factors, for example, the nature of the pigment, the nature of the mill base composition, the nature of the use of the ink composition, the nature of the jetting mechanism for the ink, and the nature of additives. In some examples, the amount (percent by weight) of pigment concentrate in the ink composition is about 0.1% to about 20%, or about 0.1% to about 15%, or about 0.1% to about 10%, or about 0.1% to about 5%, or about 0.5% to about 20%, or about 0.5% to about 15%, or about 0.5% to about 10%, or about 0.5% to about 5%, or about 1% to about 20%, or about 1% to about 15%, or about 1% to about 10%, or about 1% to about 5%, or about 2% to about 20%, or about 2% to about 15%, or about 2% to about 10%, or about 2% to about 5%, or about 3% to about 20%, or about 3% to about 15%, or about 3% to about 10%, or about 3% to about 5%, for example.

The milled mill base composition and the ink vehicle are combined under conditions such that the pigment becomes substantially evenly dispersed in the ink vehicle. In some examples, the combination is agitated for a period of about 10 to about 100 minutes, or about 10 to about 80 minutes, or about 10 to about 60 minutes, or about 10 to about 40 minutes, or about 20 to about 100 minutes, or about 20 to about 80 minutes, or about 20 to about 60 minutes, or about 20 to about 40 minutes, or about 25 to about 50 minutes, or about 25 to about 35 minutes, for example. Agitation may be accomplished, for example, by sonication, ultrasonication, or microfluidization, or a combination of the above. The temperature during formation of the dispersion may be about 10° C. to about 40° C., or about 10° C. to about 35° C., or about 10° C. to about 30° C., or about 10° C. to about 25° C., or about 10° C. to about 20° C., or about 15° C. to about 30° C., or about 15° C. to about 25° C., or about 15° C. to about 20° C., for example.

The ink composition may be filtered to remove large particles that are outside the range of those for use in an ink composition because, for example, the larger particles may prohibit or reduce the reliability of the jetting of the ink composition. In some examples, the ink composition is subjected to filtration using a filtration device having pores of a size that excludes such larger particles. Filtration may be carried out using, by way of illustration and not limitation, one or more of membrane filtration, surface filtration, depth filtration, screen filtration, and filtration aid, for example.

In some examples in accordance with the principles described herein, the ink compositions find use as inkjet inks for inkjet printers. In some examples the ink compositions may be dispensed to the surface of a broad range of substrates employing inkjet technology and equipment. The substrate may be planar, either smooth or rough, or such other shape that is suitable for the particular purpose for which it is employed. The substrate may be porous or non-porous, rigid, semi-rigid, or flexible, for example. Planar substrates may be in the form, for example, of a film, plate, board, or sheet by way of illustration and not limitation. Examples of substrate materials include, but are not limited to, plastic substrates (for example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, and acrylic), paper, paper laminated with plastic (for example, polyethylene, polypropylene, or polystyrene), cardboard, paperboard, foam board, and textiles.

In some examples in accordance with the principles described herein, the substrate has a thickness of about 0.1 mm to about 10 mm, or about 0.1 mm to about 5 mm, or about 0.1 mm to about 1 mm, or about 0.1 mm to about 0.6 mm, or about 0.5 mm to about 10 mm, or about 0.5 mm to about 5 mm, or about 0.5 mm to about 1 mm, or about 0.5 mm to about 0.6 mm, or about 1 mm to about 10 mm, or about 1 mm to about 5 mm, or about 1 mm to about 2 mm, for example.

Examples of ink compositions in accordance with the principles described herein may be dispensed from any piezoelectric, drop-on-demand inkjet printing device and many such devices are commercially available. Such inkjet printing devices are available from Hewlett-Packard, Inc., Palo Alto, Calif., by way of illustration and not limitation. In inkjet printing devices for inkjet printing, liquid ink drops are applied in a controlled fashion to an ink-receiving substrate by ejecting ink droplets from a plurality of nozzles, or orifices, in a print head of an inkjet printing device or inkjet printer. In drop-on-demand systems, a droplet of ink is ejected from an orifice directly to a position on the surface of an ink receiving substrate by pressure created by, for example, a piezoelectric device, an acoustic device, or a thermal process controlled in accordance digital data signals. An ink droplet is not generated and ejected through the orifices of the print head unless it is needed. The volume of the ejected ink drop is controlled mainly with a print head.

The printed or jetted ink on the substrate may be subjected to suitable light sources for curing the ink compositions in accordance with the principles described herein. The type of light source depends on, for example, the UV initiator used. In some examples, UV initiators can be activated by high pressure mercury lamps, xenon-lamps, arc lamps and gallium lamps, for example.

In some examples, a photosensitizer may be used with the UV initiator in amounts of about 0.01% to about 10%, or about 0.01% to about 5%, or about 0.01% to about 3%, or about 0.01% to about 1%, or about 0.1% to about 10%, or about 0.1% to about 5%, or about 0.1% to about 3%, or about 0.1% to about 1%, or about 1% to about 10%, or about 1% to about 5%, or about 1% to about 3%, or about 1% to about 2%, by weight, based on the total weight of the ink composition. A photosensitizer absorbs energy and then transfers it to another molecule, usually the photoinitiator. The structure of the photosensitizer remains unchanged. Photosensitizers are often added to shift the light absorption characteristics of a system. An example of a photosensitizer is anthracene, which is used with the diphenyliodonium cation. Suitable examples of photosensitizers include, but are not limited to, anthracene, perylene, phenothiazine, xanthone, thioxanthone, and benzophenone, for example. A photopolymerization initiation promoter may also be used. This is an agent which is not activated itself by ultraviolet radiation but which, when used with a photopolymerization initiator, helps the initiator speedup the initiation of polymerization; thus, realizing a more efficient cure.

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited as well as all of the numbers within the range and fractions of all of the numbers between and including 2 to 50. Any ranges of values provided herein include values and ranges within or between the provided ranges. As used herein, the singular forms "a", "an" and "the" include plural referents unless the content clearly dictates otherwise. In some instances, "a" or "an" as used herein means "at least one" or "one or more." Designations such as "first" and "second" are used solely for the purpose of differentiating between two items and are not meant to imply any sequence or order or importance to one item over another or any order of operation, for example.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "heteroatom" as used herein means nitrogen, oxygen, phosphorus or sulfur. The term "heterocyclic" means having an alicyclic or aromatic ring structure, which includes one or more heteroatoms.

EXAMPLES

Unless otherwise indicated, materials in the experiments below may be purchased from Aldrich Chemical Company, St. Louis Mo. Parts and percentages are by weight unless indicated otherwise.

The following abbreviations were used in the discussion below:

| Abbreviation | Definition |
| --- | --- |
| min | minute(s) |
| % wt | percentage by weight |
| m/s | meters per second |
| l/s | liter per second |
| $d_{50}$ (Zave) | mean particle size |
| cp | centipoise |
| PI | Photoinitiator |
| nm | nanometer |
| ml | milliliter |

The following materials were employed in the examples below:

| Material | Chemical Name | Manufacturer/Supplier |
| --- | --- | --- |
| AVES | divinyl ester of adipic acid | BASF Corporation |
| SOLSPERSE ® J200 (dispersing agent) | | Lubrizol Corporation |
| 228-6742 magenta pigment (PV19) | | Sun Chemical Corp., Riverside CA |
| CN435 (acrylic monomer) | ethoxylated trimethylol-propane triacrylate | Sartomer USA LLC, Exton PA |
| SR-9003 (acrylic monomer) | propoxylated neopentyl glycol diacrylate | Sartomer |
| SR-285 (acrylic monomer) | tetrahydrofurfuryl acrylate | Sartomer |
| Vinylcaprolactam (monofunctional curable monomer) | | ISP Investments Inc., Wilmington DE |
| AGISYN ® 670A2 (acrylic monomer) | aromatic urethane acrylate | AGI Corporation, Taipei Taiwan |
| OMNIRAD ® 4817 (radical PI) | 2-methyl-1-[4-(methylthio)phenyl]-2-morpholinopropan-1-one | IGM Resins, Bartlett IL |
| OMNIRAD ® TPO (radical PI) | 2,4,6-trimethylbenzoyl-diphenyl phosphine oxide | IGM Resins |
| OMNIRAD ® ITX (radical PI) | 2-isopropylthioxanthone | IGM Resins |
| IRGASTAB ® UV 22 (UV stabilizer) | quinone methide | BASF Corporation |
| BYK ® 333 (surfactant) | a polyether modified dimethylpolysiloxane | BYK Chemie GmbH |
| BYK ®-LP N 21421 (dispersing agent) | | BYK Chemie GmbH |
| IRGALITE ® Blue GLVO (pigment) | | BASF Corporation |
| TEGORAD ® 2200 (surfactant) | silicone polyether acrylate | Evonik Tego Chemie Service GmbH |
| SR506D (acrylic monomer) | isobornyl acrylate | Sartomer |
| DOUBLEMER ® 4300 (cationic monomer) | cycloaliphatic epoxide monomer | Double Bond Chemical Industries USA Inc., West Simsbury CT |
| TMPO (cationic monomer) | trimethylolpropane oxetane | Perstorp, Toledo OH |
| OXT 221 (cationic monomer) | bis{[1-ethyl(3-oxetanyl)] methyl} ether oxetane monomer | Toagosei Co. Ltd, Tokyo Japan |
| SR 399LV (acrylic monomer) | dipentaerythritol pentaacrylate | Sartomer |
| CHIVACURE ® 1176 (cationic PI) | Mixture of diphenyl(4-phenyl thio)-phenylsulfonium hexa floroatimonate and (thiodi-4,1-phenylene)bis(diphenylsulfonium) dihexafluoroatimonate | Chitec Technology Co. Ltd, Phoenix AZ |
| CHIVACURE ® 1190 (cationic PI) | Mixture of diphenyl(4-phenylthio)-phenylsulfonium hexafluorophosphate and (thiodi-4,1-phenylene) bis(diphenyl sulfonium) dihexafluorophosphate | Chitec Technology Co. Ltd |

-continued

| Material | Chemical Name | Manufacturer/Supplier |
|---|---|---|
| IRGACURE ® 819 (radical PI) | bis(2,4,6-trimethylbenzoyl)phenyl phosphine oxide | BASF Corporation |

The following test procedures were employed in the examples below:

Procedure for Testing Viscosity

The viscosity of the mill base compositions and for inkjet ink compositions was determined using a HAAKE RS-600 rheometer (Thermo Electron, Newington N.H.) and a TCP/P Peltier controlled unit (Thermo Electron). The viscosity was measured at a temperature of 25° C. for samples of mill base compositions and 40° C. for samples of inkjet ink compositions. The results were recorded at two shear rates of 500 l/s and 4000 l/s.

Procedure for Particle Size Testing—$d_{50}$ (Zave)

The $d_{50}$ particle size was determined using a Malvern Zetasizer Nano (Malvern Instruments, Malvern, Worcestershire UK). The sample was diluted at 1:1000 ratio in pure triethyleneglycol divinyl ether.

Procedure for Testing Curing Speed

The curing speed of samples of the inkjet ink compositions was determined using LC6B bench top conveyer with LH6 UV curing system (Fusion UV systems Inc., Gaithersburg Md.). The ink sample was applied to self adhesive vinyl by draw down using a K Control Coater (RK Print Coat Instruments Ltd, Litlington, UK) in a thickness of 12 or 6 microns. The ink was irradiated once under the UV lamp at different conveyer speeds. The cured ink film was tested by scratching using a paper clip immediately after each pass. The highest speed at which ink could not be scratched was reported as the curing speed.

Procedure for Testing Optical Density of Inkjet Ink Compositions

Optical density of inkjet ink compositions was tested using Beta Color densitometer (Beta Industries, Inc., Dayton Ohio). The ink sample was applied to self adhesive vinyl by draw down using a K Control Coater (RK Print Coat Instruments Ltd) in a thickness of 12 microns. The ink sample was fully cured before testing the optical density.

Procedure for Testing the Stability of Inkjet Ink Compositions

Samples of mill base compositions and inkjet ink compositions sample were placed in an oven at a temperature of 45° C. Viscosity of the aged sample was tested periodically in accordance with the procedure described above.

Example 1

The example is directed to a mill base composition comprising a divinyl ester of a dicarboxylic acid as a milling vehicle and inkjet ink compositions prepared from the milled mill base composition.

A combination of AVES (55%), SOLSPERSE® J200 (dispersing agent, 15%) and 228-6742 (magenta pigment, 30%) was prepared. A 200 ml sample of this combination was pre-mixed in a high shear mixer for 30 min. Then, the sample was transferred to a horizontal bead mill (Mini 100 mill available from Eiger Machinery Inc., Grayslake Ill.) for the first milling stage, in which 0.65 mm $ZiO_2$ YTZ beads (ZIRMIL® available from Saint-Gobain Zirpro, Le Pontet Cedex, FR) were used as the milling beads. The sample was milled at 3000 rpm for 60 min. The sample was transferred to a second mill identical to the first one but equipped to work with micro media beads. In the second milling stage the sample was milled with 0.1 mm $ZiO_2$ YTZ beads at 3500 rotations per min (rpm) for 60 min. Samples were taken after 15, 30 and 60 min. The mill base had the following composition: AVES (55%), SOLSPERSE® J200 (dispersing agent, 15%) and 228-6742 (magenta pigment, 30%). The viscosity and particle size of the mill base of Example 1 are presented in Table 1.

TABLE 1

| Example 1 Mill Base | Viscosity (cp) at 500 l/s | Viscosity (cp) at 4000 l/s | Particle Size (nm) |
|---|---|---|---|
| $1^{st}$ stage - 60 min, 0.65 mm beads | 107 | 91 | 175 |
| $2^{nd}$ stage - 15 min, 0.1 mm beads | 106 | 78 | 179 |
| $2^{nd}$ stage - 30 min, 0.1 mm beads | 112 | 83 | 154 |
| $2^{nd}$ stage - 60 min, 0.1 mm beads | 139 | 95 | 137 |

An ink composition for an inkjet printer was prepared and had the following components:

| Component Name | Functionality | % wt |
|---|---|---|
| CN 435 | Acrylic monomer | 10 |
| SR 9003 | Acrylic monomer | 25 |
| SR 285 | Acrylic monomer | 15 |
| V-Cap | Vinylcaprolactam | 20.7 |
| AGISYN ® 670A2 | Acrylic monomer | 10 |
| OMNIRAD ® 4817 | Radical PI | 1.5 |
| OMNIRAD ® TPO | Radical PI | 3.5 |
| OMNIRAD ® ITX | Radical PI | 2 |
| IRGASTAB ® UV22 | UV stabilizer | 0.1 |
| BYK ® 333 | Surfactant | 0.2 |
| Mill base (Example 1) | Pigment concentrate | 12 |

The above inkjet ink composition was prepared with two samples of the mill base composition of Example 1, a first sample with mill base composition taken from the second stage after 15 min of milling, the second sample with mill base taken from the second stage after 60 min of milling. The inkjet ink optical density, viscosity upon assembly and after 2 weeks of aging in a 45° C. oven is presented in Table 2.

TABLE 2

| | | t = 0 (upon assembly) | | t = 2 weeks @ 45° C. | |
|---|---|---|---|---|---|
| Example 1 Inkjet Inks | Optical Density | Viscosity (cp) at 500 1/s | Viscosity (cp) at 4000 1/s | Viscosity (cp) at 500 1/s | Viscosity (cp) at 4000 1/s |
| Ink 1 Mill Base 15 min | 1.84 | 11.7 | 11.46 | 11.84 | 11.52 |
| Ink 2 Mill Base 60 min | 1.85 | 11.84 | 11.52 | 12.6 | 12.09 |

The curing speed of the inkjet inks samples was tested according to the test procedure described above. The maximum curing speed was found to be 2 m/s.

Example 1A

For purposes of comparison, a mill base composition was prepared with acrylic monomer as a known milling vehicle in place of AVES of Example 1 and an inkjet ink was prepared therefrom. The ink was produced using the same dispersant, pigment and milling conditions as the ink of Example 1. A combination of SR 9003 (55%), SOLSPERSE® J200 (dispersing agent, 15%) and 228-6742 (magenta pigment, 30%) was prepared and subjected to the same milling process as described in Example 1. The viscosity and particle size of the mill base in comparative Example 1A are presented in Table 3.

TABLE 3

| Mill Base - Example 1A | Viscosity (cp) at 500 1/s | Viscosity (cp) at 4000 1/s | Particle Size (nm) |
|---|---|---|---|
| $1^{st}$ stage - 60 min, 0.65 mm beads | 330 | 280 | 161 |
| $2^{nd}$ stage - 15 min, 0.1 mm beads | 160 | 137 | 135 |
| $2^{nd}$ stage - 30 min, 0.1 mm beads | 184 | 151 | 133 |
| $2^{nd}$ stage - 60 min, 0.1 mm beads | 230 | 175 | 119 |

A test inkjet ink formulation was prepared from the mill base of Example 1A in the same manner as in Example 1 with two samples of mill base taken after 15 min and 60 min, respectively. The other components of the inkjet ink formulation were as set forth above for the inkjet ink formulation produced using the mill base composition of Example 1. The optical density and the viscosity upon assembly and after 2 weeks of aging in a 45° C. oven for the inkjet formulation prepared from the mill base of Example 1A is presented in Table 4 for purposes of comparison.

TABLE 4

| | | t = 0 (upon assembly) | | t = 2 weeks @ 45° C. | |
|---|---|---|---|---|---|
| Example 1A Inkjet Inks | Optical Density | Viscosity (cp) at 500 1/s | Viscosity (cp) at 4000 1/s | Viscosity (cp) at 500 1/s | Viscosity (cp) at 4000 1/s |
| Ink 1 Mill Base 15 min | 1.88 | 13.4 | 13.2 | 13.7 | 13.4 |
| Ink 2 Mill Base 60 min | 1.84 | 14.45 | 14.2 | 14.8 | 14.4 |

Inkjet ink samples of the comparative Example 1A were tested for curing speed according to the procedure described above. The maximum curing speed was found to be 2 m/s.

Discussion of Results of Example 1 and Comparative Example 1A

The use of AVES as a milling vehicle produced a mill base composition with considerably lower mill base viscosity than that for a mill base composition where a known milling vehicle, namely, an acrylic monomer (SR 9003) was employed. The mill base viscosity with AVES was under 100 cp in 4000 1/s as compared to 150 cp in 4000 1/s for the mill base made with acrylic monomer (SR 9003). The lower viscosity mill base allows for better usage in inkjet ink formulations achieving lower viscosity inks. The inkjet ink of Example 1 was 1.94 cp and 2.68 cp lower at 4000 1/s (15 min and 60 min, respectively) compared to the inkjet ink in comparative Example 1A. Milling with AVES in the mill base composition allowed for better rheology control in the inkjet ink prepared therefrom than that of comparative Example 1A.

It can be seen that inkjet ink made with a mill base composition comprising AVES and milled for 15 min and 60 min resulted in similar viscosities of 11.46 cp and 11.58 cp in 4000 1/s, respectively, whereas a mill base composition made with acrylic monomer SR 9003 resulted in different inkjet ink viscosities of 13.4 cp and 14.2 cp in 4000 1/s, respectively.

The particle size of the mill base composition of Example 1 was a little larger than that for the mill base composition of comparative Example 1A, by 16 nm and 18 nm after 15 min and 60 min, respectively. This difference is not significant and does not influence color density as there was a negligible difference in optical density measurements made on the printed articles using the respective inkjet ink samples of Examples 1 and 1A.

Samples of inkjet ink prepared in Example 1 exhibited aging stability in a 45° C. oven that was comparable to the samples of inkjet ink prepared in Example 1A. The results of the aging stability studies of the inkjet inks prepared in Examples 1 and 1A are summarized in Table 5.

TABLE 5

| Inkjet Sample | % Change 500 1/s | % Change 4000 1/s |
|---|---|---|
| Mill base of Example 1 - 15 min | 2.24% | 1.51% |
| Mill base of Example 1 - 60 min | 6.50% | 5.30% |
| Comparative Example 1A - 15 min | 1.20% | 0.50% |
| Comparative Example 1A - 60 min | 6.40% | 4.90% |

The above ink aging results are considered to be within an acceptable threshold for inkjet inks. The inkjet ink of Example 1 exhibited similar curing speed as with inkjet ink of comparable Example 1A indicating that using AVES in a mill base composition rather than the known acrylic monomer (SR 9003) milling vehicle did not influence inkjet ink curing speed.

Example 2

This example was carried out in a manner similar to that for Example 1 with the exception that a different dispersant was employed in the mill base composition and the components of the mill base composition were present in different weight percentages than that of Example 1. A combination of AVES (40%), BYK®-LP N 21421 (dispersing agent, 30%) and 228-6742 (magenta pigment, 30%) was prepared. The components were pre-mixed in a high shear mixer in the order given and milled using the same milling conditions described in Example 1. Samples were taken at the same time intervals. The viscosity and particle size of the mill base composition of Example 2 are summarized in Table 6:

TABLE 6

| Example 2 Mill Base | Viscosity (cp) at 500 1/s | Viscosity (cp) at 4000 1/s | Particle Size (nm) |
|---|---|---|---|
| 1st stage - 60 min, 0.65 mm beads | 77 | 57 | 176 |
| 2nd stage - 15 min, 0.1 mm beads | 68 | 53 | 150 |
| 2nd stage - 30 min, 0.1 mm beads | 95.5 | 66.5 | 140 |
| 2nd stage - 60 min, 0.1 mm beads | 223 | 110 | 136 |

An inkjet ink formulation was prepared in the same manner as in Example 1 with the exception that the above mill base composition of Example 2 was employed in place of the mill base composition of Example 1. The inkjet ink formulation of Example 2 was prepared with two samples, as in Example 1, with mill base samples after 15 min and 60 min. The optical density and the viscosity upon assembly and after 2 weeks of aging in 45° C. oven for the inkjet formulation prepared from the mill base composition of Example 2 is presented in Table 7.

TABLE 7

| Example 2 Inkjet Inks | Optical Density | t = 0 (upon assembly) | | t = 2 weeks @ 45° C. | |
|---|---|---|---|---|---|
| | | Viscosity (cp) at 500 1/s | Viscosity (cp) at 4000 1/s | Viscosity (cp) at 500 1/s | Viscosity (cp) at 4000 1/s |
| Ink 1 Mill Base 15 min | 1.82 | 11.18 | 11.05 | 12.3 | 11.96 |
| Ink 2 Mill Base 60 min | 1.88 | 11.62 | 11.45 | 13.04 | 12.63 |

Example 2 inkjet ink samples were tested for curing speed according to the procedure described above; the maximum curing speed was found to be 2 m/s.

Example 2A

For purposes of comparison, a mill base composition was prepared with acrylic monomer as a known milling vehicle in place of AVES of Example 2 and an inkjet ink was prepared therefrom. The ink was produced using the same dispersant, pigment and milling conditions as the ink of Example 2. A combination of SR 9003 (40%), BYK®-LP N 21421 (dispersing agent, 30%) and 228-6742 (magenta pigment, 30%) was prepared and subjected to the same milling process as described in Example 1. The viscosity and particle size of the mill base composition in comparative Example 2A are presented in Table 8.

TABLE 8

| Comparative Example 2A Mill Base | Viscosity (cp) at 500 1/s | Viscosity (cp) at 4000 1/s | Particle Size (nm) |
|---|---|---|---|
| 1st stage - 60 min, 0.65 mm beads | 196 | 140 | 168 |
| 2nd stage - 15 min, 0.1 mm beads | 189 | 125 | 144 |
| 2nd stage - 30 min, 0.1 mm beads | 362 | 165 | 149 |
| 2nd stage - 60 min, 0.1 mm beads | 1226 | 64 | 144 |

A test inkjet ink formulation was prepared from the mill base of Example 2A in the same manner as in Example 2 with two samples of mill base taken after 15 min and 60 min, respectively. The other components of the inkjet ink formulation were as set forth above for the inkjet ink formulation produced using the mill base composition of Example 2. The optical density and the viscosity upon assembly and after 2 weeks of aging in a 45° C. oven for the inkjet formulation prepared from the mill base of Example 2A is presented in Table 9 for purposes of comparison.

TABLE 9

| Comparative Example 2A Inkjet Inks | Optical Density | t = 0 (upon assembly) | | t = 2 weeks @ 45° C. | |
|---|---|---|---|---|---|
| | | Viscosity (cp) at 500 1/s | Viscosity (cp) at 4000 1/s | Viscosity (cp) at 500 1/s | Viscosity (cp) at 4000 1/s |
| Ink 1 Mill Base 15 min | 1.84 | 12 | 11.96 | 13.86 | 13.2 |
| Ink 2 Mill Base 60 min | 1.88 | 13.2 | 12.7 | 16 | 15.8 |

Inkjet ink samples prepared from the mill base composition of Example 2A were tested for curing speed according to the procedure described above; the maximum curing speed was found to be 2 m/s.

Discussion of Results of Example 2 and Comparative Example 2A

As seen in the comparison made in Examples 1 and 1A, using AVES as a milling vehicle resulted in a considerably lower mill base viscosity than the corresponding known milling vehicle, acrylic monomer SR 9003. The viscosity of the mill base composition with AVES was lower than 70 cp in 4000 1/s compared to 165 cp in 4000 1/s for the mill base composition made with acrylic monomer (SR 9003) up to 30 min milling time. Milling the mill base composition with AVES (Example 2) up to 60 min resulted in a viscosity increase to 223 cp in 500 1/s and 110 cp in 4000 1/s whereas milling the mill base composition with acrylic monomer SR9003 (comparative Example 2A) up to 60 min resulted in a viscosity increase to 1125 cp in 500 1/s and 64 cp in 4000 1/s. The significant difference in viscosity between low shear and high shear when the mill base composition comprises known acrylic monomer indicates that the mill base composition of Example 2A was not stable under the above milling conditions. Therefore, it appears evident that a mill base composition comprising AVES improves product stability during milling.

The lower viscosity mill base composition of Example 2 appeared to provide better usage in inkjet ink formulations achieving lower viscosity inks similarly to the data shown in Example 1. The inkjet ink of Example 2 was 0.91 cp to 1.25 cp lower at 4000 1/s (15 min and 60 min, respectively) compared to the inkjet ink of comparative Example 2A.

Milling a mill base composition comprising AVES appeared to enable better rheology control in an inkjet ink formulation comprising the milled mill base composition comprising AVES. The inkjet ink made with the mill base composition comprising AVES (Example 2) milled for 15 min and 60 min resulted in viscosities of 11.05 cp and 11.46 cp in 4000 1/s, respectively, bringing the viscosity difference to 0.4 cp, whereas mill base composition comprising acrylic monomer SR 9003 milled for 15 min and 60 min (comparative Example 2A) resulted in inkjet ink viscosities of 11.96 cp and 12.7 cp in 4000 1/s, respectively, with a viscosity difference of 0.74 cp.

The particle size of the mill base composition of Example 2 was comparable to the particle size measured in comparative Example 2A in most milling times, and the difference did not appear to influence color density as there was a negligible difference in optical density measurements made on the inkjet inks samples.

Inkjet ink samples of Example 2 showed improved aging stability in a 45° C. oven as compared to the inkjet ink samples of comparative Example 2A. Table 10 summarizes the aging stability of the inkjet inks of Examples 2 and 2A.

TABLE 10

| Inkjet Sample | % Change 500 1/s | % Change 4000 1/s |
|---|---|---|
| Example 2 - 15 min | 10.00% | 8.20% |
| Example 2 - 60 min | 12.20% | 10.30% |
| Comparative Example 2A - 15 min | 15.50% | 13.90% |
| Comparative Example 2A - 60 min | 21.20% | 24.40% |

Thus, an inkjet ink comprising a milled mill base composition comprising AVES exhibits improved inkjet ink aging stability. The inkjet ink of Example 2 exhibited curing speeds similar to that for inkjet ink of comparative Example 2A. Thus, it appears that the use of AVES instead of SR 9003 in a mill base composition did not influence the inkjet ink curing speed.

Example 3

This example was carried out in a manner similar to that for Example 1 with the exception that a different pigment was employed in the mill base composition. A combination of AVES (55%), SOLSPERSE® J200 (dispersing agent, 15%) and IRGALITE® Blue GLVO (pigment, 30%) was prepared. The components were pre-mixed in a high shear mixer in the order given and milled using the same milling conditions described in Example 1. Samples were taken at the same time intervals. The viscosity and particle size of the mill base composition of Example 3 is summarized in Table 11:

TABLE 11

| Example 3 Mill Base | Viscosity (cp) at 500 1/s | Viscosity (cp) at 4000 1/s | Particle Size (nm) |
|---|---|---|---|
| 1st stage - 60 min, 0.65 mm beads | 73.5 | 64 | 118 |
| 2nd stage - 15 min, 0.1 mm beads | 85 | 67.3 | 198 |
| 2nd stage - 30 min, 0.1 mm beads | 268 | 111 | 182 |
| 2nd stage - 60 min, 0.1 mm beads | 752 | 231 | 192 |

An ink composition for an inkjet printer was prepared and had the following components:

| Component Name | Functionality | % wt |
|---|---|---|
| CN 435 | Acrylic monomer | 10 |
| SR 9003 | Acrylic monomer | 25 |
| SR 285 | Acrylic monomer | 15 |
| V-Cap | Vinylcaprolactam | 22.7 |
| AGISYN ® 670A2 | Acrylic monomer | 12 |
| OMNIRAD ® 4817 | Radical PI | 1.5 |
| OMNIRAD ® TPO | Radical PI | 4.5 |
| OMNIRAD ® ITX | Radical PI | 2 |
| IRGASTAB ® UV22 | UV stabilizer | 0.1 |
| TEGORAD ® 2200 | Surfactant | 0.2 |
| Mill base (Example 3) | Pigment concentrate | 7 |

As in Example 1, the inkjet ink of Example 3 was prepared with two samples, namely, mill base samples after 15 min and 60 min. The inkjet ink optical density, viscosity upon assembly and after 2 weeks of aging in a 45° C. oven is presented in Table 12.

TABLE 12

| Example 3 Inkjet Inks | Optical Density | t = 0 (upon assembly) | | t = 2 weeks @ 45 C. | |
|---|---|---|---|---|---|
| | | Viscosity (cp) at 500 1/s | Viscosity (cp) at 4000 1/s | Viscosity (cp) at 500 1/s | Viscosity (cp) at 4000 1/s |
| Ink 1, Mill Base 15 min | 2.39 | 11.2 | 11 | 11.35 | 11.05 |
| Ink 2, Mill Base 60 min | 2.49 | 12.17 | 12 | 13 | 12.4 |

The inkjet inks samples of Example 3 were tested for curing speed according to the procedure described above; the maximum curing speed was found to be 1.5 m/s.

Example 3A

For purposes of comparison, a mill base composition was prepared with acrylic monomer as a known milling vehicle in place of AVES of Example 3 and an inkjet ink was prepared therefrom. The ink was produced using the same dispersant, pigment and milling conditions as the ink of Example 3. A combination of SR 9003 (55%), SOLSPERSE® J200 (dispersing agent, 15%) and IRGALITE® Blue GLVO (pigment, 30%) was prepared and subjected to the same milling process as described in Example 3. The viscosity and particle size of the mill base in comparative Example 3A are presented in Table 13.

TABLE 13

| Comparative Example 3A Mill Base | Viscosity (cp) at 500 1/s | Viscosity (cp) at 4000 1/s | $d_{50}$ Zave (nm) |
|---|---|---|---|
| 1st stage - 60 min, 0.65 mm beads | 221 | 187 | 127 |
| 2nd stage - 15 min, 0.1 mm beads | 229 | 144 | 173 |
| 2nd stage - 30 min, 0.1 mm beads | 415 | 200 | 228 |
| 2nd stage - 60 min, 0.1 mm beads | 783 | 290 | 247 |

A test inkjet ink formulation was prepared from the mill base of Example 3A in the same manner as in Example 3 with two samples of mill base taken after 15 min and 60 min, respectively. The other components of the inkjet ink formulation were as set forth above for the inkjet ink formulation produced using the mill base composition of Example 3. The optical density and the viscosity upon assembly and after 2 weeks of aging in a 45° C. oven for the inkjet formulation prepared from the mill base of Example 3A is presented in Table 14 for purposes of comparison.

TABLE 14

| Comparative Example 3A Inkjet Inks | Optical Density | t = 0 (upon assembly) | | t = 2 weeks @ 45° C. | |
|---|---|---|---|---|---|
| | | Viscosity (cp) at 500 1/s | Viscosity (cp) at 4000 1/s | Viscosity (cp) at 500 1/s | Viscosity (cp) at 4000 1/s |
| Ink 1 Mill Base 15 min | 2.38 | 11.96 | 11.6 | 12.3 | 11.9 |
| Ink 2 Mill Base 60 min | 2.47 | 12.5 | 12.35 | 13.5 | 12.63 |

Inkjet ink samples prepared from the mill base composition of Example 3A were tested for curing speed according to the procedure described above; the maximum curing speed was found to be 1.5 m/s.

Discussion of Results of Example 3 and Comparative Example 3A

The improved milling performance of a mill base composition comprising AVES was observed using a different pigment than that of Example 1. The viscosity of the mill base composition of Example 3 was up to 111 cp at 4000 l/s when milled for 30 min whereas the viscosity of the mill base composition of Example 3A was 200 cp at 4000 l/s when milled for 30 min.

A significant difference was noticed in the first stage milling performance. The viscosity of the mill base composition of Example 3 in the first stage (after 60 min with 0.65 mm beads) was 73.5 cp and 64 cp at 500 l/s and 4000 l/s, respectively, whereas the viscosity of the mill base composition of Example 3A under the same milling conditions was 221 cp and 187 cp at 500 l/s and 4000 l/s, respectively. This large difference substantiates that the use of AVES in a mill base composition (Example 3) exhibited better performance over a mill base composition comprising an acrylic monomer (Example 3A). Furthermore, the mill base composition of comparative Example 3A reached a very high viscosity value of 415 cp at 500 l/s after 30 min of milling compared to 268 cp at the same conditions with AVES in the mill base composition of Example 3. In both examples milling to 60 min destabilized the system as can be observed from the very high viscosity results in 500 l/s.

The lower viscosity of the mill base composition of Example 3 provided for better usage in inkjet ink formulations achieving lower viscosity inks similarly to the data shown in previous examples. The viscosity of the inkjet ink of Example 3 was 0.35 cp to 0.6 cp lower at 4000 l/s (15 min and 6 min, respectively) compared to the inkjet ink of comparative Example 3A.

In both examples measured particle size increased when milling in 0.1 mm beads compared to 0.65 mm beads. However, in comparative Example 3A the particle size was significantly larger by 46 nm and 55 nm after 30 min and 60 min of milling, respectively. The data demonstrate that particle size is increasing with milling time for the mill base composition of comparative Example 3A while the particle size remained constant for the mill base composition comprising AVES.

Inkjet ink samples of Example 3 showed improved aging stability in a 45° C. oven as compared to the inkjet ink samples of comparative Example 3A. Table 15 summarizes the aging stability of the inkjet inks of Examples 3 and 3A.

TABLE 15

| Inkjet Sample | % Change 500 1/s | % Change 4000 1/s |
|---|---|---|
| Example 3, 15 min | 1.30% | 0.01% |
| Example 3, 60 min | 6.82% | 3.33% |
| Comparative Example 3A, 15 min | 2.80% | 2.60% |
| Comparative Example 3A, 60 min | 8.00% | 2.30% |

The above aging results are considered to be within acceptable threshold levels for inkjet inks. The inkjet ink of Example 3 exhibited curing speeds similar to that for inkjet ink of comparative Example 3A. Thus, it appears that the use of AVES instead of SR 9003 in a mill base composition did not influence the inkjet ink curing speed.

Example 4

The milled mill base composition from Example 1 was used to prepare a cationic radical hybrid inkjet ink formulation, which had the following components:

| Component Name | Functionality | % wt |
|---|---|---|
| SR 506D | Acrylic monomer | 18 |
| DOUBLEMER ® 4300 | Cationic monomer | 21.65 |
| TMPO | Cationic monomer | 20 |
| OXT ® 221 | Cationic monomer | 14 |
| SR 399LV | Acrylic monomer | 3 |
| CHIVACURE ® 1176 | Cationic PI | 2.5 |
| CHIVACURE ® 1176 | Cationic PI | 2.5 |
| IRGACURE ® 819 | Radical PI | 3.5 |
| IRGASTAB ® UV22 | UV stabilizer | 0.15 |
| TEGORAD ® 2200 | Surfactant | 0.2 |
| Mill base (Example 1) | Pigment concentrate | 14.5 |

The viscosity of the hybrid inkjet ink of Example 4 above was measured according to the procedure described above and was 10.84 cp at 4000 l/s. The stability of the ink was tested and, after two weeks of aging at 45° C., the viscosity of the ink increased to 13.34 cp at 4000 l/s.

Example 4A

The milled mill base composition from Example 1A (wherein an acrylic monomer SR 90003 was used in the mill base composition in place of AVES) was used to prepare a cationic radical hybrid inkjet ink formulation, which had the same composition as that in Example 4 except for the use of the milled mill base composition of Example 1A in place of the milled mill base composition of Example 1.

The viscosity of hybrid inkjet ink prepared above (Example 4A) was measured according to the procedure described above and was 12.72 cp at 4000 l/s. The stability of the ink was tested and, after two weeks of aging at 45° C., the viscosity of the ink increased to 15.95 cp at 4000 l/s. In addition, sedimentation and phase separation was observed in hybrid inkjet ink of comparative Example 4A after two weeks of aging at 45° C.

Discussion of Results of Example 4 and Comparative Example 4A

The above Examples 4 and 4A demonstrate that a divinyl ester (AVES) can be used to prepare a mill base composition, which after milling may be employed advantageously in a cationic radical hybrid ink formulation. The viscosity of the hybrid inkjet ink of Example 4 prepared using a milled mill base composition comprising a divinyl ester component, as measured, was 1.88 cp lower than the hybrid inkjet ink prepared using a milled mill base composition comprising an acrylic monomer (SR 9003) as in comparative Example 4A.

The hybrid inkjet ink of Example 4 exhibited increased viscosity after two weeks of aging at 45° C. to 13.34 cp, a significant increase yet still within working parameters for typical UV inkjet inks, whereas the hybrid inkjet ink of comparative Example 4A exhibited increased viscosity after two weeks of aging at 45° C. to 15.95 cp, which is considered to be a viscosity that is too high for an inkjet ink. In addition, the hybrid inkjet ink of comparative Example 4A ink showed phase separation and sedimentation after aging and therefore, the inkjet ink of comparative Example 4A is not stable enough to be used in an inkjet application. The hybrid inkjet ink of Example 4 did not exhibit phase separation and sedimentation after aging under the same conditions.

It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A mill base composition comprising:
a divinyl ester of a dicarboxylic acid wherein the dicarboxylic acid comprises from 2 to about 8 carbon atoms, and wherein the divinyl ester is present at from 30% to 60% by weight out of the total weight of the mill base composition,
a dispersing agent, and
a pigment.

2. The mill base composition according to claim 1 wherein the dicarboxylic acid is selected from the group consisting of oxalic acid, malonic acid, succinic acid, glutaric acid, adipic acid, cyclohexyl dicarboxylic acid, phthalic acid, terephthalic acid, and pimelic acid.

3. The mill base composition according to claim 1 wherein the dispersing agent is selected from the group consisting of polyesters, polyurethanes, and polyalkylene imines.

4. The mill base composition according to claim 1 wherein the dispersing agent is present in an amount of about 5% to about 50% by weight of the mill base composition.

5. The mill base composition according to claim 1 wherein the dispersing agent further comprises an organic solvent in an amount of about 30% to about 50% by weight of the dispersing agent.

6. The mill base composition according to claim 5 wherein the organic solvent is selected from the group consisting of acetates, glycols, and combinations of acetates and glycols.

7. The mill base composition according to claim 1 wherein the dispersing agent further comprises a (meth)acrylic monomer in an amount of about 30% to about 50% by weight of the dispersing agent.

8. The mill base composition according to claim 7 wherein the (meth)acrylic monomer is selected from the group consisting of 2-phenoxyethyl acrylate, isophoryl acrylate, isodecyl acrylate, tridecyl acrylate, lauryl acrylate, 2-(2-ethoxyethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate, and combinations of two or more thereof.

9. The mill base composition according to claim 1 wherein the pigment is present in an amount of about 10% to about 70% by weight of the mill base.

10. A UV curable ink composition comprising:
an ink vehicle, and
the mill base composition according to claim 1 wherein the mill base composition has been subjected to milling.

11. The UV curable ink composition according to claim 10 wherein the ink vehicle comprises one or more of a UV curable agent, a UV initiator, a surfactant and a UV stabilizing agent.

12. A method of preparing a mill base composition, said method comprising:
(a) providing in combination
a compound comprising a divinyl ester of a dicarboxylic acid wherein the dicarboxylic acid comprises from 2 to about 8 carbon atoms wherein the divinyl ester is present at from 30% to 60% by weight out of the total weight of the mill base composition,
a dispersing agent,
a pigment, and
milling beads; and
(b) subjecting the combination to milling.

13. The method according to claim 12 wherein (a) and (b) are repeated one or more times using milling beads of decreasing diameter.

14. A UV curable ink composition, the composition comprising:
(a) a pigment concentrate that is a milled mill base composition, the mill base composition comprising (i) a compound comprising a divinyl ester of a dicarboxylic acid wherein the dicarboxylic acid comprises from 2 to about 8 carbon atoms wherein the divinyl ester is present at from 30% to 60% by weight out of the total weight of the mill base composition, (ii) a dispersing agent, and (iii) a pigment;
(b) one or more UV curable monomers; and
(c) one or more UV initiators.

15. The mill base composition according to claim 1 wherein the mill base comprises from 40% to 55% by weight of the divinyl ester.

16. The mill base composition according to claim 1 further comprising a milling media having a diameter not larger than about 0.3 millimeters.

* * * * *

UNITED STATES PATENT AND TRADEMARK OFFICE
CERTIFICATE OF CORRECTION

PATENT NO. : 9,187,666 B2  
APPLICATION NO. : 14/110153  
DATED : November 17, 2015  
INVENTOR(S) : Or Brandstein et al.

Page 1 of 1

It is certified that error appears in the above-identified patent and that said Letters Patent is hereby corrected as shown below:

Title page

Item (75), Inventors, in column 1, line 2, delete "Petach Tiqwa" and insert -- Petach Tikva --, therefor.

Item (75), Inventors, in column 1, lines 4-5, delete "Kfar Yonah" and insert -- Kfar Yona --, therefor.

Signed and Sealed this  
Twenty-first Day of June, 2016

Michelle K. Lee  
*Director of the United States Patent and Trademark Office*